United States Patent Office 3,450,800
Patented June 17, 1969

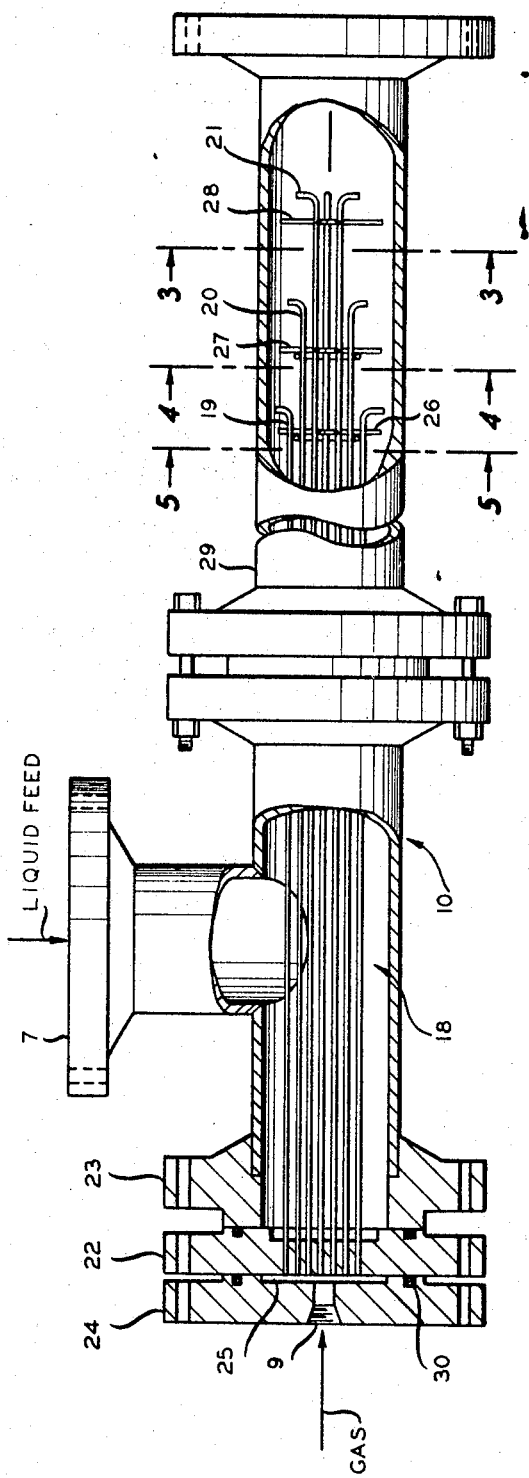
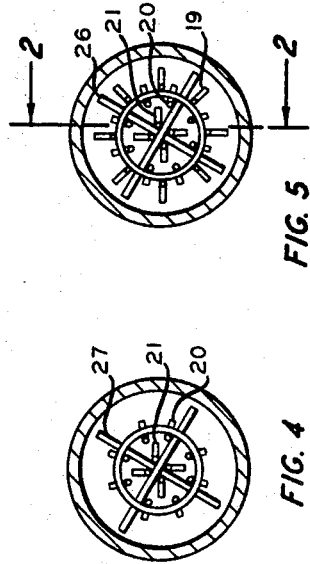
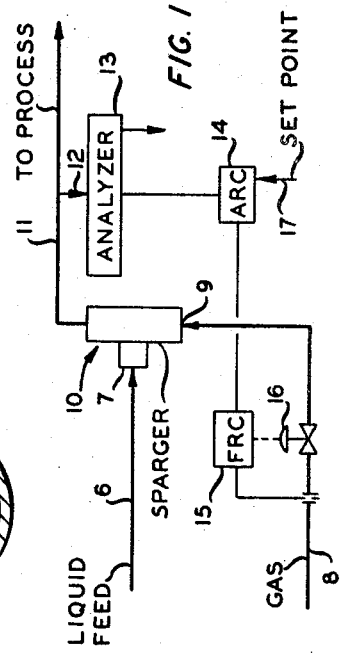

3,450,800
DISPERSING GASES INTO LIQUIDS
Dexter E. Smith, Arthur B. Broerman, and Robert M. Keeler, Bartlesville, Okla., assignors to Phillips Petroleum Company, a corporation of Delaware
Filed Jan. 31, 1964, Ser. No. 341,661
Int. Cl. C08f 1/80, 1/06, 1/98
U.S. Cl. 260—93.7       2 Claims This invention relates to an improved method and means for dispersing gases into a moving liquid stream. In one of its more specific aspects it relates to a process for polymerizing olefins, particularly propylene, in the presence of a controlled, small amount of hydrogen to produce a solid polymer having very specific and highly desired properties. In another aspect this invention relates to the continuous introduction of a controlled, small concentration of hydrogen into a moving liquid propylene stream.

The polymerization of olefins, particularly propylene, to high molecular weight resins is well known and it is recognized that highly crystalline polymers, frequently designated as isotactic polypropylene, are preferred for most practical applications. Numerous procedures have been disclosed for the production of solid polymers from alpha olefins, especially propylene. A well-known procedure for the production of polymers of a high isotactic content involves polymerizing propylene in the presence of a catalyst system comprising an organometal, preferably an alkyl aluminum compound, and a titanium halide, especially titanium trichloride. However, processes heretofore proposed have been found to have numerous drawbacks in their operation, either in the properties of the products obtained or in the efficiency of operation.

It has already been proposed to regulate the melt index, flexural modulus and catalyst productivity of such polymers, i.e., polymers of propylene, by carying out the polymerization in the presence of a very small concentration of hydrogen. This process, of course, is not free of inconveniences. For example, it is very difficult to achieve and maintain the exact concentration of hydrogen desired at all locations in the liquid phase of the reaction zone and, therefore, to regulate the melt index, flexural modulus and catalyst productivity within the desired limits, flexural modulus and melt index being somewhat dependent upon the polymerization temperature and particularly dependent upon the concentration of hydrogen present during polymerization.

According to the invention a method and means are provided for dispersing a gas into a liquid stream rapidly and with thorough mixing so that the concentration of the gas in the liquid can be maintained at its desired value, uniformly even under changing conditions of flow of the liquid stream.

It is therefore an object of this invention to provide a method and means for uniformly and rapidly dispersing a gas into a liquid stream. Another object of the invention is to provide a method and means for dispersing a gas into a moving liquid stream, in a concentration significantly below the solubility limit, with sufficient mixing of the gas with the liquid stream so that the gas will be substantially uniformly distributed in the liquid by the time solution is accomplished. A further object of the invention is to provide a method and means for dispersing hydrogen, significantly below the solubility limit, into a moving liquid propylene stream in a minimum of time and space so that the concentration of hydrogen in propylene can be closely controlled. Further objects and advantages of the invention will become apparent to one skilled in the art upon consideration of this disclosure including the detailed description of the invention and the drawing.

Broadly speaking, the present invention resides in passing a gas into a moving liquid stream through a plurality of capillary openings spaced over the cross-sectional area of the liquid stream and positioned normal to the direction of flow of liquid. In a preferred embodiment of the invention a matrix array of capillary tubing of different lengths is positioned in the moving liquid stream so as to obtain a 3-dimensional distribution of gas outlets in the liquid stream. The capillary tubes in the matrix array are positioned substantially parallel to the longitudinal axis of the moving liquid stream and the open ends of the capillary tubes are turned about 90 degrees so that the capillary openings are substantially normal to the direction of flow of liquid whereby the gas bubbles are sheared from the capillary openings as the bubbles are formed. This 3-dimensional matrix array of dispersion points provides a sparging arrangement that gives maximum dispersion of the gas in the liquid and minimizes the probability of bubbles recombining to form larger bubbles which, in turn, would require more time and/or greater operating pressure to dissolve the gas. A preferred method for mounting this sparging arrangement is to use a vessel in the shape of a pipe T in which the flow path of the liquid makes a 90-degree turn and the bundle of capillary tubing is positioned in the straight run of the T. The apparatus is preferably positioned so that the gas passes vertically into the apparatus and the liquid stream, after making the 90-degree turn, flows upwardly through the apparatus. This will prevent the buoyancy velocity vector of the gas bubbles from carrying the bubbles to the top side of the vessel, which might occur if the gas and liquid flow were horizontal, particularly at flow rates in the low Reynolds number region. This assumes pressure sufficiently low that the gas density is lower than the liquid density. The buoyancy vector of the bubbles will provide greater separation of the bubbles with an upward flow of liquid and gas.

A preferred embodiment of the invention is shown in the drawing wherein:

FIGURE 1 is a schematic flow diagram showing an installation of a sparger of the invention positioned in a liquid process stream;

FIGURE 2 is a view, in partial section, of a sparger of the invention positioned in a pipe T;

FIGURE 3 is a section along line 3—3 of FIGURE 2;

FIGURE 4 is a section along line 4—4 of FIGURE 2; and

FIGURE 5 is a sectional view along line 5—5 of FIGURE 2.

Referring now to FIGURE 1, a liquid feed stream, e.g., a liquid propylene stream, is passed via conduit 6 to inlet 7 and a gas, e.g., hydrogen, is passed via conduit 8 to inlet 9 of sparging apparatus 10. The effluent from sparger 10 passes via conduit 11 to a process, for example, a polymerization process (not shown). A liquid sample is removed from the effluent of sparging device 10 via conduit 12 and passed to an analyzer 13 such as a gas chromatograph. A signal representative of the concentration of hydrogen in propylene is generated in analyzer 13 and this signal is passed to analyzer recorder controller 14 which actuates flow recorder controller 15 to open or close valve 16 as required to maintain a desired concentration of hydrogen in propylene as determined by the set point 17 of analyzer recorder controller 14. If desired, analyzer 13, in addition to measuring hydrogen concentration, can also measure the concentration of another component, such as a comonomer, and such measurement can be used for automatic control purposes also.

In FIGURE 2 sparger 10 is shown in more detail. Sparger 10 is made up from a T adapted for bolted flange connections with the bundle of capillary tubing 18 positioned in the straight run of the T so that the gas enters the tube bundle via inlet 9 and the liquid propylene is admitted to the inlet 7. The tubes 19, 20 and 21 are secured at one end in openings in flange member 22 which is secured in position between the flange 23 and the flange 24 by bolts (not shown). Flange 24 has a recessed portion 25 which acts as a manifold between the inlet 9 and the open ends of the tubes of tube bundle 18. Spacers 26, 27 and 28 maintain the desired spaced relationship of the tubes of tube bundle 18. A section of conduit 29, of sufficient length to enclose the tube bundle 18, completes the housing of the sparger assembly 10. The tubes are secured to the spacers by suitable means such as welding. FIGURES 3, 4 and 5 show the arrangement of the 3-dimensional tubing arrangement of the tube bundle 18 with respect to the spacers 26, 27 and 28. Seals such as O-ring seal 30 are utilized where a seal is indicated.

Propylene can be polymerized in high yields to solid propylene homopolymer having high flexural modulus values by conducting the polymerization in a mass system in the presence of a catalyst formed by mixing a dialkyl-aluminumhalide compound and a titanium trichloride complex and in the presence of a controlled small amount of dissolved elemental hydrogen. More specifically, a process for polymerizing propylene to form an improved solid propylene homopolymer having a melt index value in the range from about 0.1 to 10.0 (or higher) (ASTM D–1238–57T, Condition L, from 1962 ASTM Preprint) comprises polymerizing propylene in a mass system at a temperature in the range of 100 to 160° F. and at a pressure sufficient to maintain liquid phase conditions, in the presence of a catalyst formed by mixing a dialkylaluminumhalide compound and a titanium trichloride complex and in the presence of from 0.03 to 0.40 mol percent hydrogen in the liquid phase and recovering polypropylene therefrom. Hydrogen gas can also be added to the liquid monomer or comonomer stream in the polymerization of other alpha olefins such as ethylene or 1-butene and mixtures of ethylene or propylene with other alpha olefins.

The amount of hydrogen employed in the polymerization must be controlled within very narrow limits in order to achieve the desired properties for specific polymer products. While the hydrogen concentration in the liquid phase in the reaction zone can be in the range from 0.08 to 0.30 mol percent or even 0.03 to 0.40 mol percent when producing polypropylene, the hydrogen concentration will sometimes be required to be limited to a deviation of less than 0.01 mol percent from the selected hydrogen concentration. It has been found that a 1 percent deviation from a selected value of hydrogen concentration will result in approximately a 2.5 percent change in the melt index property of the polypropylene produced.

A more comprehensive understanding of the invention can be obtained by referring to the following illustrative examples which are not intended, however, to be unduly limitative of the invention.

EXAMPLES

Runs in pilot plant operation and in a commercial plant, utilizing equipment substantially as shown in the drawing, have demonstrated that hydrogen concentration in the propylene feed can be controlled within 50 parts per million of the desired concentration. In a typical commercial operation for the production of polypropylene film for use as wrapper film in food processing, the desired hydrogen concentration of the propylene feed is set at about 0.125 mol percent where full scale of the analyzer is 0.250 mol percent and each recorder chart division represents 25 parts per million. The system of the present invention controls the hydrogen concentration well within ±2 chart divisions or well within ±50 p.p.m. The melt index (determined as previously described) of the resulting polymer is about 5.0 and does not vary more than ±10 percent of its value (that is 5.0±0.5 MI units) when other operating variables such as temperature, percent polymer, and pressure in the reaction zone are maintained substantially constant.

The sparger of the present invention provides substantially complete and substantially instantaneous, uniform solution of the hydrogen in the liquid propylene so that the sample to be analyzed can be taken immediately downstream from the sparger whereby there is a minimum of lag time between sampling and correction for deviation of hydrogen concentration from the set value. The problem of maintaining the desired concentration of hydrogen in propylene within very narrow limits has been solved by the sparger of this invention.

Although the sparger of this invention has been described with specific reference to the introduction of hydrogen gas into a liquid propylene stream, the applicability of the method and means of the invention is not so limited. The sparger can be used to add a measured and controlled amount of any gas to any mobile liquid. Thus a modifier gas can be added to reactant liquids. A gas catalyst, e.g., HF; $BF_3$, can be added to a liquid reactant. Gaseous HCl can be added as a catalyst poison to liquid reactants to shortstop a reaction. Carbonation of a liquid can be accomplished with the sparger of this invention.

That which is claimed is:

1. In a process for polymerizing propylene wherein a liquid propylene stream containing a measured concentration of hydrogen is passed to a polymerization zone, the method of maintaining the hydrogen concentration of the propylene stream substantially constant which comprises passing said propylene stream upwardly through a conduit; introducing hydrogen gas into said propylene stream through a plurality of capillary openings spaced at different distances over the cross-sectional area of the liquid stream and positioned substantially normal to the flow of propylene; sensing the hydrogen concentration of the propylene stream substantially immediately downstream from the hydrogen gas introduction; and controlling the quantity of hydrogen passed into said propylene in response to the sensed hydrogen concentration of the propylene stream.

2. The process of claim 1 wherein the hydrogen concentration of the propylene stream is a value in the range from about 0.03 to 0.40 mol percent and the deviation from the value is maintained within about 50 p.p.m. on a mol basis.

References Cited

UNITED STATES PATENTS

| 3,002,961 | 10/1961 | Kirschner et al. | 260—93.7 |
| 3,005,626 | 10/1961 | Loomans | 261—124 |
| 3,051,690 | 8/1962 | Vandenberg | 260—94.96 |
| 3,146,223 | 8/1964 | Cheney | 260—94.9 |
| 3,232,715 | 2/1966 | Indest | 261—124 |

JOSEPH L. SCHOFER, Primary Examiner.

L. EDELMAN, Assistant Examiner.

U.S. Cl. X.R.

260—88.2, 94.9; 261—76, 78, 118, 124